United States Patent [19]

Zhang

[11] Patent Number: 5,075,010
[45] Date of Patent: Dec. 24, 1991

[54] GROUND WATER FILTER FOR OBTAINING DRINKING WATER

[76] Inventor: Yun H. Zhang, 774 Potrero Ave., San Francisco, Calif. 94110

[21] Appl. No.: 628,785

[22] Filed: Dec. 17, 1990

[51] Int. Cl.[5] .............................................. B01D 61/38
[52] U.S. Cl. ..................................... 210/638; 210/643
[58] Field of Search ...................... 210/638, 643, 321.6, 210/321.72, 500.21, 500.22

[56] References Cited

U.S. PATENT DOCUMENTS 4,701,261 10/1987 Gibbs et al. ......................... 210/606

FOREIGN PATENT DOCUMENTS 7735994 11/1977 France .
51-102343 of 1975 Japan .
58-186493 of 1982 Japan .
WO89/11454 5/1988 PCT Int'l Appl. .

OTHER PUBLICATIONS

Sung et al., "Kinetics and Product of Ferrous Iron Oxygenation in Aqueous Systems", Environment Science and Technology, vol. 14, No. 5, 1980.
Sung, comments on "Identity and Character of Iron Precipitates", authors R. Bruce Robinson et al., J. of Environmental Engineering, vol. 109, No. 1, Feb. 1983, pp. 269–274.
Sung et al., "Some Considerations on Iron Removal", J. of Environmental Engineering, vol. 110, No. 6, Dec. 1984, pp. 1048–1061.

Primary Examiner—Frank Sever
Attorney, Agent, or Firm—Townsend and Townsend

[57] ABSTRACT

The water filtration system according to the present invention includes a containment vessel(s) in which a filtration matrix is contained. The filtration matrix comprises a plurality of particles on which a regenerative membrane is formed directly on the surface. Through extensive experimentation, it has been found that the conditions suitable for reducing iron and manganese from water entering the vessel can be performed simply by controlling the amount of $Fe^{3+}$ and pH in raw water entering the containment vessel. This is true even though the chemical characteristics of the underground water are changing.

In one embodiment, the matrix comprises a plurality of polymeric particles selected from particles having specific gravity ranging from about 1.4 to about 2.7. Further, the particles have a nonuniformity coefficient no greater than about 2, and an average particle diameter ranging from about 1.0 mm to about 1.6 mm. The membrane formed on the particles is a product of reaction between oxygen and an impurity selected from $Fe^{2+}$ and manganese. Preferably, the membrane comprises iron oxyhydroxide (FeO(OH)).

11 Claims, 6 Drawing Sheets

GROUND WATER FILTER FOR OBTAINING DRINKING WATER

BACKGROUND OF THE INVENTION

The present invention relates to water filtration systems and apparatus, particularly those for removing iron and manganese from underground water.

While there are a variety of techniques and processes for iron and manganese removal from water sources, most removal processes can be generalized into three major categories: oxidation followed by solids/liquid separation; ion exchange; and coordination (sequestration and/or stabilization). See for example, Sung, W. and Forbes, E. J., *Some Considerations On Iron Removal, Journal of Environmental Engineering*, Volume 110, No. 6, December, 1984. Sung and Forbes note the most common control technique may be chlorination followed by filtration, which falls under the first category. They note, however, that recent advances link the formation of high levels of trihalomethanes with prechlorination, which may necessitate a modification of this approach, favoring aeration or oxidation.

Prior oxidation processes for iron removal from aqueous systems include oxidizing ferrous ($Fe^{2+}$) iron to ferric ($Fe^{3+}$) iron (i.e., changing a water-soluble $Fe^{2+}$ into water-insoluble $Fe^{3+}$), and then removing $Fe^{3+}$ in a large filtration pond, where the insoluble iron settles. In these traditional processes, raw water is typically aerated (or an oxidizing agent added) before entering a large oxidation pond wherein a slow oxidation reaction (spontaneous oxidation) occurs. However, the oxidation rate is rather slow for such an iron removal process, since the procedure is largely a physical settling of the insoluble iron.

Attempts have been made to improve on this process. One apparatus includes adding air to water containing ferrous iron, organic matter, and $H_2S$. See Japanese patent document 51-102343. The water-air mixture passes through a filtrating layer such as limestone, carbon, plus iron oxyhydroxide (FeOOH) as an optional catalyst. In this system, the incoming raw water is saturated with oxygen, the filtrating layer always operating under aerofillic conditions. French patent 77 35994 (Foessel) discloses a gravity filtration system which eliminates iron, manganese, and calcium from water. A first filter bed includes sand of various particle sizes which removes most of the iron and some of the manganese, as well as organic compounds. A porous element contactor exists between a sand filter and a carbon filter. Manganese remaining after passing through the sand filter deposits at the outlet of the porous element contactor. Water free of iron, manganese, and calcium is obtained after the water passes through the carbon filter. Air is injected counter-concurrently into the first sand filter. In this system, solids which form on the top surface of the sand filter, which may include iron oxyhydroxides, are evacuated through a conduit, to keep the sand filter from clogging.

Attempts have been made to explain the wide variation in reported rate constant for oxygenation kinetics of $Fe^{2+}$. Sung and Morgan, *Kinetics And Products of Ferrous Iron Oxygenation In Aqueous Systems, American Chemical Society*, Volume 14, No. 5, May, 1980, studied the effect of ions, alkalinity, and temperature on oxygenation kinetics, and attempted to identify products of oxygenation. Both homogeneous and heterogeneous oxygenation kinetics were studied. The homogeneous oxidation rate constant, at constant pH and oxygen concentration in the water, was found to drop with increasing ionic strength, and to increase with increasing temperature. Chloride ions and sulfide ions reduced oxygenation rate. The heterogeneous oxidation study concluded that autocatalysis is noticeable only around a pH of 7 or above due apparently to the particulate surfaces forming faster and adsorption of $Fe^{2+}$ being more favorable at these pH's. Sung and Forbes, mentioned above, noted that one key to removing iron from water is how to remove FeOOH particles, either by flocculation or filtration. They also note that iron removal by filtration is not well understood, noting that silica has been reported to both promote and retard iron removal, and affects the iron precipitates. Sung, *Identity And Character Of Iron Precipitates, Journal Of Environmental Engineering*, Volume 109, February, 1983, notes that typical iron hydroxide solids have surface area of about 200 $m^2$/gm and that the aging process of these solids decreases the surface area and total active sites for $Fe^{2+}$ adsorption by a factor of about 10. Japanese patent publication 58-186493 discloses a combination chlorination/oxidation system, followed by filtration to remove iron from underground water. Granulated oyster shell is soaked in NaClO, then water having oxygen dissolved therein is passed through. The treating agent is said to be regenerated by backwashing. Also of interest is WO89-11454 (Partanen), which discloses a counter-current flow of air and water which helps to remove scale from filter surfaces. A chemical or biologic material functions as a first iron removal stage, followed by a filtration screen.

Many of the above methods and apparatus are expensive to operate and complicated to control. The ability of removing iron and manganese from water depends on several factors, such as pH, alkalinity, sulfate ion concentration, soluble silica, etc. Further, even those processes which apparently use iron oxyhydroxide as catalyst exhibit an aging process in which the catalyst surface decreases in total active sites for iron adsorption over time. Still further, most of the above-mentioned systems require extensive backwashing to remove insoluble material.

It would be advantageous to develop an iron and/or manganese removal system which significantly reduces costs of manufacturing and operation, which provides a filter media which does not substantially age or wear out, which does not require a replacement, which is environmentally clean, and in which backwashing is short (less than about 10 minutes).

SUMMARY OF THE INVENTION

It has now been discovered, through experience of several decades and thousands of experiments, that a filter media can be produced under certain chemical conditions which will immediately react upon contact with $Fe^{2+}$ present in source water, thus carrying on a contact oxidation. $Fe^{3+}$ is thus formed by the rapid oxidizing of $Fe^{2+}$ and removed. Through use of this filter media, the rate of oxidation is about 60 times that of spontaneous oxidation. Therefore, the time for iron removal is greatly shortened and the process simplified. Also, there is no need for a huge oxidation pool.

The water filtration system according to the present invention comprises a containment vessel(s) in which a filtration matrix is contained. The filtration matrix comprises a plurality of particles on which a regenerative membrane is formed directly on the particle surface. Through extensive experimentation, it has been found that the conditions suitable for reducing iron and manganese from water entering the vessel can be performed simply by controlling the amount of $Fe^{3+}$ and pH in raw water entering the containment vessel. This is true even though the chemical characteristics of the underground water are changing.

In one embodiment, the matrix comprises a plurality of particles (for example anthracite, quartz sand, or nonpoisonous plastic granules) selected from particles having specific gravity ranging from about 1.4 to about 2.7. Further, the particles have a nonuniformity coefficient no greater than about 2, and an average particle diameter ranging from about 1.0 mm to about 1.6 mm. The membrane is preferably formed on the upper surface of a bed of such particles, the membrane being a product of reaction between oxygen and an impurity selected from the group consisting of $Fe^{2+}$ and $Mn^{4+}$. Preferably, the membrane comprises iron oxyhydroxide (FeO(OH)).

There are many advantages to the water filtration system and apparatus of the present invention. When underground water enters the vessel, it will be filtered by washing the water for about 6 to 10 minutes. There is no need to stop the process (turn off the machine) for a period of time to release oncoming underground water. The underground water passing out from the double vessel filter is suitable for human consumption. As iron and manganese are removed, the water has reached the international standard for daily use and human consumption, that is, filtered water should contain iron at a concentration of less than about 0.3 mg/l.

The membrane formed in the vessel and on the plurality of particles is a contact oxidation membrane having an oxidation rate of approximately 25 times faster than the existing filter media, as long as pH and $Fe^{3+}$ concentration in the effluent is properly controlled. The membrane will never age, become worn out, or require replacement.

No expensive and complicated automatic control devices are needed to operate the filter. An electrically operated control panel can operate the machine in several ways: removal and filtration of iron and manganese, backwash, and stop. The water filtration system requires a smaller amount of energy and backwash water than prior art systems. Since the influent (water pumped from a deep well), instead of high pressure water, can be used for backwashing, there is no need to install a special water tower or a high pressure water pump. This not only cuts down initial expenses of installation, but also simplifies operation of the water filtration system. The water filtration system includes a containment vessel or vessels, an air compressor (or ejector), a tubular mixer, and pertinent pipeline, making it very convenient for installation and maintenance. The filtration system occupies a smaller area and operates with lower cost than ordinary iron removal systems, and the water filtration system can process water for human daily consumption and water for industrial use separately, reducing the cost of water processing by reducing the amount of water needed to be filtered.

The water filtration system is not only suitable to be used in families, it is also to be used in large metropolitan cities. The quality of water supplied from the water filtration system is excellent. Further, only simple crafts are necessary to build this water filtration system; when underground water containing iron and manganese flows through the filtration system having the extraordinary oxidizing power explained herein, the water effluent is suitable for human consumption, the water being substantially free of water and manganese.

The water filtration system requires only one procedure while other filtration systems require three or more procedures. Utilizing the new craft to build the factory saves approximately 42% in investment cost. The two extra procedures required by other filtration systems require complicated structural engineering with expensive equipment and large buildings. Moreover, the present water filtration system may save approximately 50% of available land space.

The water filtration system of the present invention is easy and convenient to maintain. All that is required is to install an inexpensive space-saving filter or pool filter which has strong oxidizing power. When underground water containing iron and manganese flows through the filter, they are removed, while reducing electric power consumption roughly 60% over prior art water filtration systems.

A further aspect of the invention is the use of a strainer head mounted in the bottom of the filtration system containment vessels. This unique strainer head reduces the height of particles required and thus lowers the costs of the filtration system even more by reducing the size of the containment vessel required. Further, the strainer head increases the overall filtration rate since backwashing is more effective.

Further aspects and advantages of the invention will become apparent in reference to the following drawing figures and the discussion which follows.

DESCRIPTION OF PREFERRED EMBODIMENTS

Figure 1:
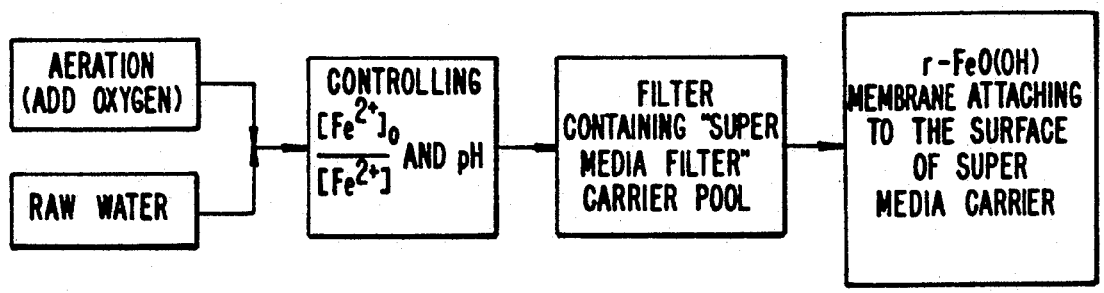
FIG. 1 shows a schematic process flow diagram of the method of treating ground water according to the present invention.

FIG. 1 shows a schematic diagram of the method of treating ground water to remove iron and manganese. Raw water is aerated with oxygen containing gas (typically air), with this mixture having a controlled $[Fe^{2+}]_o/[Fe^{2+}]$ ratio and pH, as explained further herein below, being fed to one or more vessels containing the filter matrix particles (anthracite, quartz sand, nonpoisonous plastic granules, etc.). The FeO(OH) membrane attaches to the top surface of the bed of particles.

Figure 2:
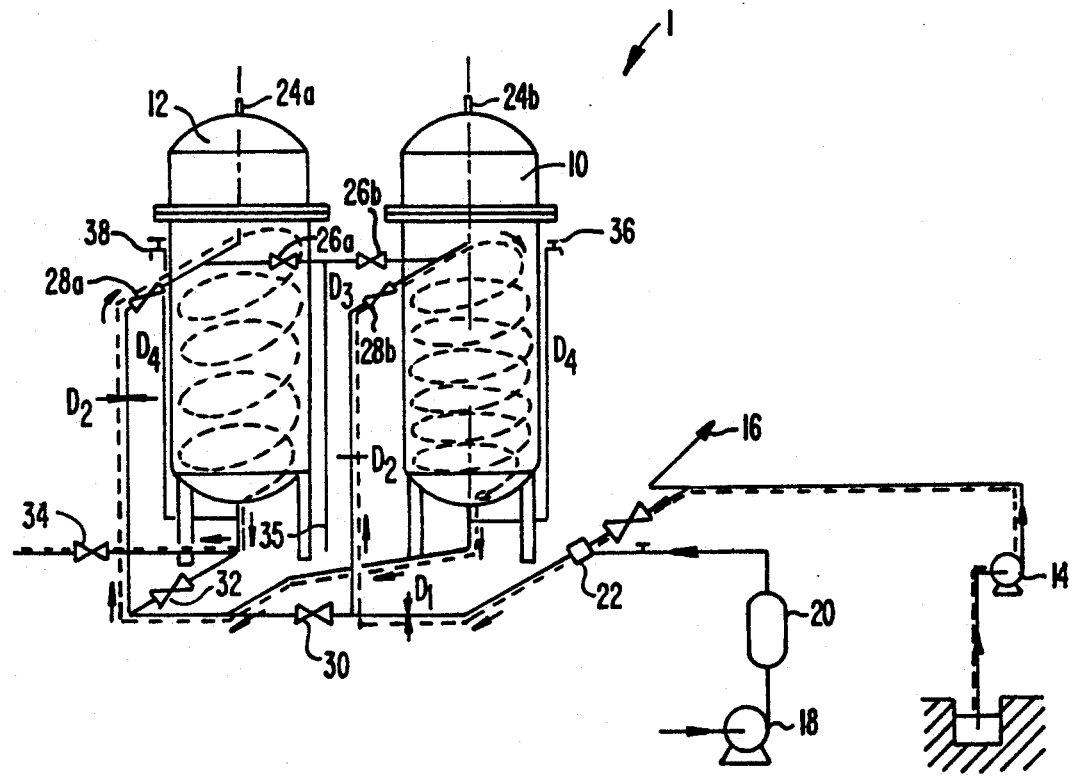
FIG. 2 shows a more detailed schematic diagram of a drinking water filter and process in accordance in the present invention.

FIG. 2 shows a more detailed schematic diagram of a typical water filtration system and apparatus in accordance with the present invention. The filtration system, generally shown at 1, includes first and second containment vessels, 10 and 12, respectively, which receive water via a pump 14 from an underground well or other source of raw water. Production water may be taken off directly via connections such as 16. For drinking water purposes, air is injected into the water via compressor or ejector 18, the air passing through a filter 20 and then into a tubular mixer 22 where air and water are mixed. Containment vessels 10 and 12 each have a relief valve, shown as 24a and 24b, which remain closed under normal water pressure conditions.

The operation of the apparatus shown in FIG. 2 proceeds through three modes of operation: filtration, backwash, and stop or rest mode. In the filtration mode, where iron and other soluble ions are turned into insoluble compounds, valves 30, 32, 26a and 26b are closed and valves 28a, 28b and 34 are open, so that influent water enters the containment vessels 10 and 12 sequentially. Clean, substantially deferrized water for direct use for storage in a water tower exits the system through valve 34 or taps 36 or 38. It will be recognized that valve 36 will be closed if both containment vessels 10 and 12 are to be used for filtration purposes, whereas valve 38 will be closed and 36 open if only containment vessel 10 is to be utilized. Choice of how many filtrating steps or containment vessels are needed are conveniently determined with reference to the raw water source. The dotted line in FIG. 2 shows the approximate path of water in the filtration mode, while $D_1$, $D_2$, $D_3$, and $D_4$ represent piping diameters useful for the apparatus (see Table 3.)

In the backwash mode, valves 28a, 28b, and 34 are closed and valves 30, 32, 26a, and 26b are open. Raw water pumped from a deep well or other source enters containment vessel 10 and containment vessel 12 in a backflow mode, and "dirty" water drains off via pipe 35. In the stop or rest mode, valves 26a, 26b, 28a, 28b, 32, 30, and 34 are all closed.

When using the apparatus in the filtration mode, addition of air into tubular mixture 22 should be about 0.1 to about 0.3 times the volume of influent raw water, allowing easy selection of the air compressor or ejector 18. The rated capacity of the filtration system is calculated on the basis of 12 working hours per day, and on this analogy, 24 hours of operation would double the drinking water supply.

The effluent filtered water pressure depends on the influent raw water pressure. Generally, when the influent pressure ranges from about 2 to 4 kg/cm$^2$ (preferably no more than about 5 kg/cm$^2$, the effluent pressure will be about 2.0 kg/cm$^2$ to about 2.5 kg/cm$^2$) which is generally high enough to press water to 40 or 50 feet, roughly equivalent to four or five stories of a building.

In the backwashing mode, the actual time taken for backwashing is very little depending on the actual size of the containment vessels 10 and 12 and amount of contaminants or impurities in the raw water supplied to the system. For the sizes of containment vessels used herein, the appropriate backwashing time ranges roughly from about 6 minutes to about 10 minutes.

Figure 3:
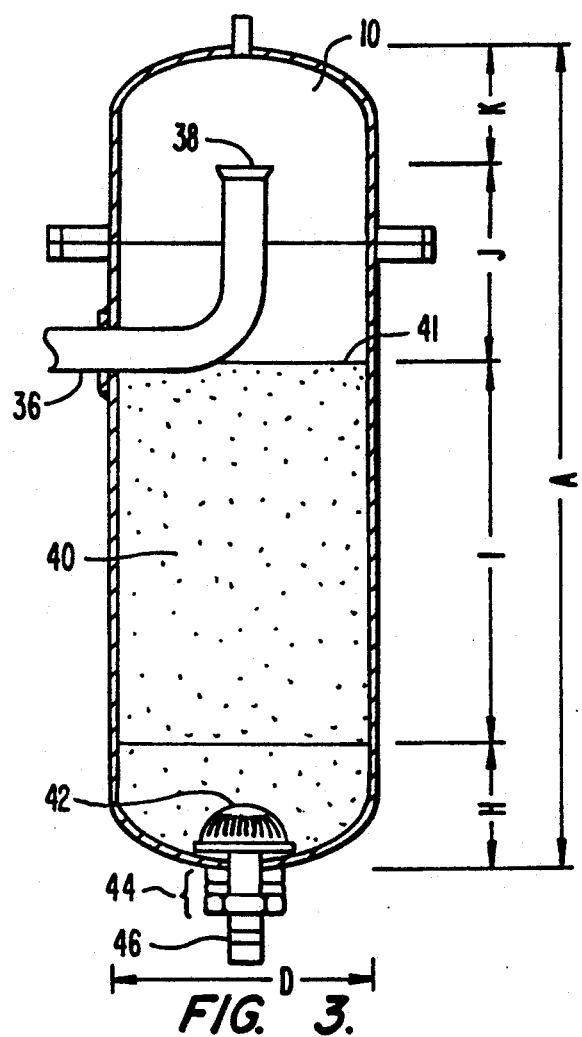
FIG. 3 shows a sectioned, side elevation of a containment vessel for the drinking water filtration system.

Referring now to FIG. 3, this figure shows a side elevation, partially sectioned view of one containment vessel. This view shows first containment vessel 10 having a raw water inlet line 36 from which water may enter into the containment vessel 10 in any manner. In FIG. 3, raw water flows vertically and exits through nozzle 38. A matrix of particles 40 is shown in the lower approximately ⅔ of containment vessel 10. This matrix may be selected from various materials having specific gravity ranging from about 1.4 to about 2.7, having nonuniformity coefficient K ($d_{80}/d_{10}$) less than about 2, and having an average particle diameter ranging from about 1.0 to about 1.6 mm. Examples of such materials are anthracite granules, quartz sand of various mesh sizes, and nonpoisonous plastic granules, made from materials such as polyethylene. The matrix bed has on its top surface a layer of FeO(OH) (sometimes referred to as FeOOH) formed from reacting Fe$^{3+}$ with oxygen while controlling the pH above about 6, and controlling the Fe$^{3+}$ entering the vessels within the range of from about 1 mg per liter to about 5 mg per liter. The matrix of particles 40 rests on the top of a strainer head 42 shown in FIG. 2 at the bottom of containment vessel 10. Strainer head 42 is fastened to containment vessel 10 through flange connection 44 and effluent line 46.

Figure 4:
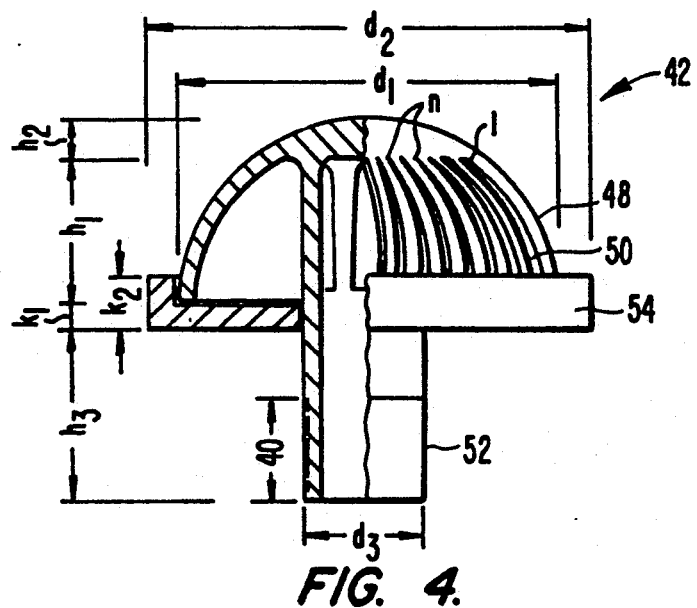
FIG. 4 shows a partially sectioned, side elevation view of a strainer head in accordance with the present invention.

FIG. 4 shows a partially sectioned side elevation view of a strainer head in accordance with the present invention. Strainer head 42 has a bell shaped outer body 48 having a plurality of elongate passages 50 through outer body 48. Elongate passages 50 gradually widen from the top portion of the strainer head down to the bottom of the bell shaped body. Other shapes for the strainer head may function in a similar manner, and the claims are not limited by this particular shape.

FIGS. 3 and 4 (also see FIGS. 5b and 5c) show reference letters indicating length dimensions for actual embodiments of containment vessels and stainer heads in accordance with the present invention. This data is presented in tabular form. See tables 1, 2 and 3 herein.

TABLE 1

Specification of T-strainer heads (Gap width: 0.9 mm)
(Dimensions in mm)

| Model | $D_1$ | $d_2$ | $d_3$ | $h_1$ | $h_2$ | $h_3$ | $k_1$ | $k_2$ | n | l |
|---|---|---|---|---|---|---|---|---|---|---|
| $T_1$ | 112 | 100 | 25 | 52 | 48 | 70 | 6 | 5 | 18 | 34 |
| $T_2$ | 112 | 100 | 32 | 52 | 48 | 70 | 6 | 5 | 20 | 34 |
| $T_3$ | 216 | 200 | 32 | 107 | 93 | 70 | 8 | 6 | 16 | 70.5 |
| $T_4$ | 216 | 200 | 40 | 107 | 93 | 100 | 8 | 6 | 22 | 70.5 |
| $T_5$ | 216 | 200 | 50 | 107 | 93 | 100 | 8 | 6 | 30 | 70.5 |

TABLE 2

Specification of T-strainer heads and air intake needed for difference model filters

| Model of filter | Model of T-strainer head | Air intake (1/min) |
|---|---|---|
| $Y_1$ | $T_1$ | 1.4 |
| $Y_2$ | $T_2$ | 2.4 |
| $Y_3$ | $T_3$ | 3.0 |
| $Y_4$ | $T_4$ | 4.1 |
| $Y_5$ | $T_5$ | 6.0 |

TABLE 3

| Model | Treatment Capacity (1/sec) | Number of Persons Supplied | Dimensions (mm) | | | | | | | | | | | | | | |
|---|---|---|---|---|---|---|---|---|---|---|---|---|---|---|---|---|---|
| | | | A | B | C | D | E | F | G | H | I | J | K | $D_1$ | $D_2$ | $D_3$ | $D_4$ |
| $Y_1$ | 0.116 | 5–8 | 900 | 200 | 700 | 250 | 500 | 550 | 250 | 150 | 400 | 200 | 150 | 20 | 15 | 25 | 15 |
| $Y_2$ | 0.2 | 8–10 | 900 | 200 | 700 | 300 | 500 | 600 | 250 | 150 | 400 | 200 | 150 | 25 | 15 | 32 | 15 |
| $Y_3$ | 0.24 | 10–15 | 950 | 250 | 700 | 350 | 500 | 650 | 250 | 200 | 400 | 200 | 150 | 25 | 15 | 40 | 15 |
| $Y_4$ | 0.34 | 15–20 | 1000 | 300 | 700 | 400 | 500 | 800 | 250 | 200 | 400 | 200 | 200 | 32 | 20 | 50 | 15 |

TABLE 3-continued

| Model | Treatment Capacity (1/sec) | Number of Persons Supplied | Dimensions (mm) | | | | | | | | | | | | | | |
|---|---|---|---|---|---|---|---|---|---|---|---|---|---|---|---|---|---|
| | | | A | B | C | D | E | F | G | H | I | J | K | $D_1$ | $D_2$ | $D_3$ | $D_4$ |
| $Y_5$ | 0.46 | 20-30 | 1100 | 400 | 700 | 500 | 500 | 900 | 250 | 240 | 400 | 210 | 250 | 40 | 20 | 50 | 15 |

1. Material of Y-filter: Stainless steel.
2. Working pressure: 5 kg/cm².
3. When the influent pressure is 3 kg/cm², the effluent pressure will be 2.2 kg/cm². Such a pressure is high enough to press water to 4 stories of a building.

For example, model $T_1$ has diameter $D_1$ of 112 mm, diameter $D_2$ of 100 mm, diameter $D_3$ 25 mm, etc. Table 2 shows the air intake corresponding various strainer heads. For example, the $T_1$ strainer head will be able to accommodate an air intake of 1.4 liters per minute, whereas the $T_2$ strainer head will have an air requirement of 2.4 liters per minute. Table 3 shows that, for example, filter model $Y_1$ has a treatment capacity of 0.116 liters per second, which will supply about 5 to 8 people with a steady drinking water supply. The dimensions of model $Y_1$ are shown in Table 3 in the first row of numbers. For example, filter model $Y_1$ has a total height dimension "A" of 900 mm.

Figure 5A:
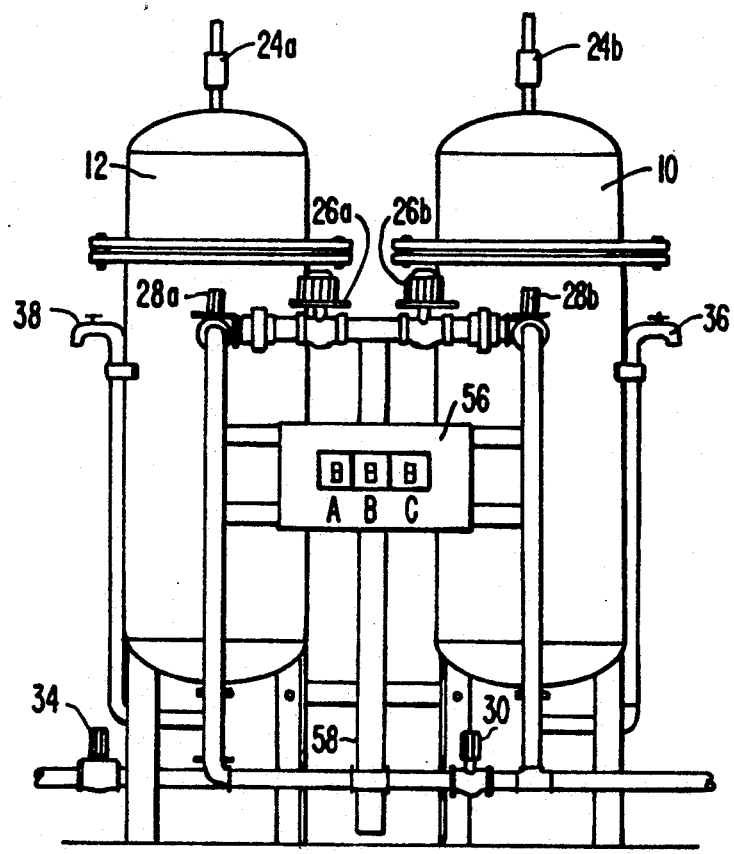
FIGS. 5(a-c) show front elevation, plan, and side elevation views of the drinking water filtration apparatus.
Figure 5B:
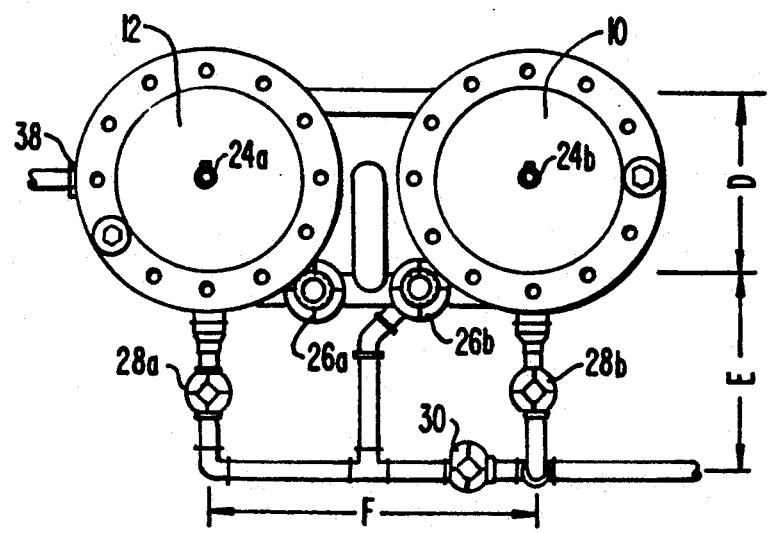
Figure 5C:
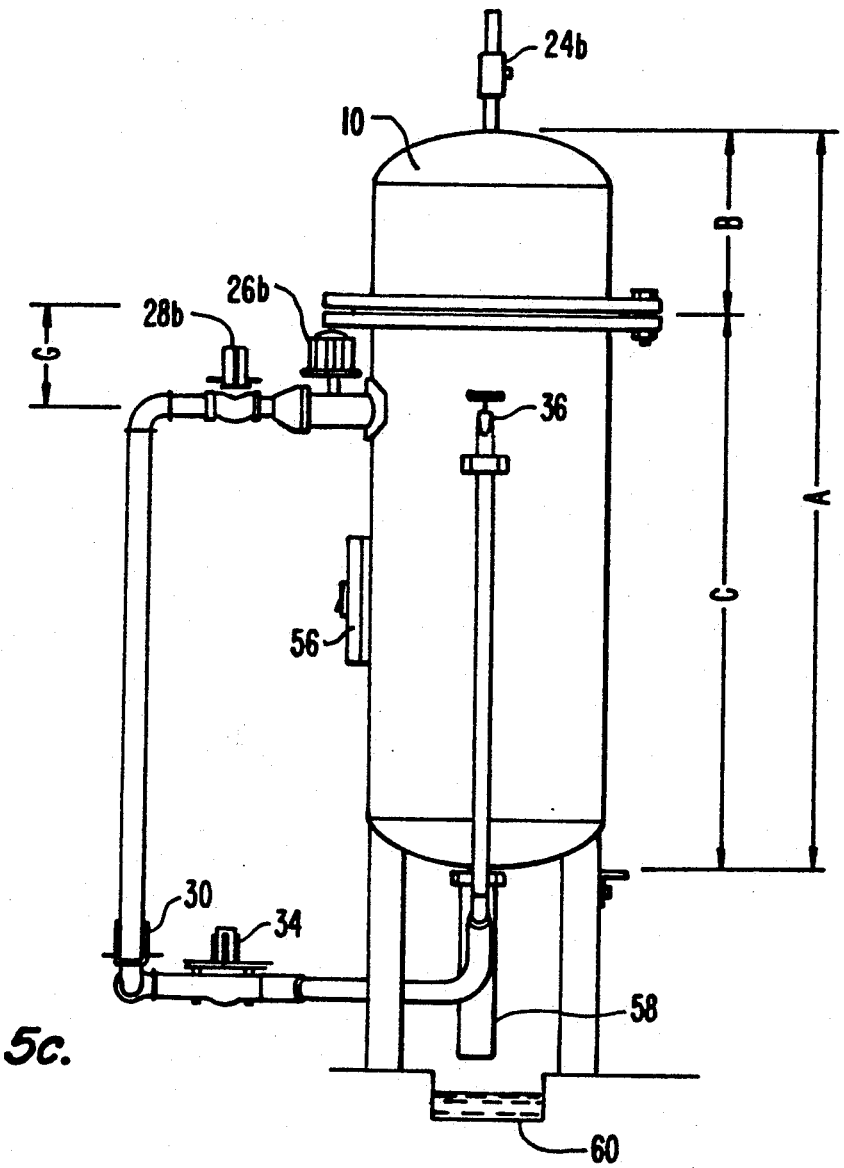

Turning now FIGS. 5a-c, FIG. 5a shows a front elevation view of a water filtration system in accordance with the present invention having two containment vessels 10 and 12. Further shown in FIG. 5a is a control panel 56 having three buttons for filtration mode, backwash mode, and rest mode, respectively. For example, button "A" may be utilized for filtration, button "B" for backwash, and button "C" for stop or rest mode. In this embodiment of the invention, valves 26a, 26b, 28a, 28b, 30, 32, and 34 are all automatic valves; in other words, signals from control panel 56 are effective to actuate the valves. The automatic valves may be motor-operated valves, for example. FIG. 5b shows a plan view of the apparatus of FIG. 5a showing more specifically the position of various motor-operated valves in the apparatus. FIG. 5c shows a side elevation view of the containment vessel 10 of FIGS. 5a and 5b. In particular, drain pipe 58 is shown which allows water in the backwash mode to exit from the system into a drain system 60. Drain pipe 58 is also shown in FIG. 5a.

The filtration system as shown in FIGS. 2-5(a-c) may be used to filter underground water which contains less than about 30 mg per liter, more preferably less than about 25 mg per liter of iron, and pH not lower than about 6. For raw water which contains iron over 25 mg per liter or with manganese, iron and manganese may be removed by adding one or more vessels such as containment vessel 12. Underground water passing out from the double containment vessel filter is suitable for human consumption, as iron and manganese are removed so that the effluent water has reached the international standard for daily use and human consumption of less than about 0.3 mg per liter of iron.

The containment vessels 10 and 11, associated piping, valves, strainer heads and tubular mixers are all made of commonly known materials such as cast iron, stainless steel, or regular carbon steel. Plastic apparatus may be also be used, although this is not the preferred embodiment. The preferred material of construction for containment vessels, valves, associated piping, etc. is one of the many grades of stainless steel, such as 316 stainless, 304 stainless, etc. Again, this will depend on the impurity content of the raw water to be processed. More corrosive impurities within the water may require the use of other materials of construction such as brass, or nickel-plated metals.

The regenerative membrane formed on the particles contained in the containment vessels 10 and 12 can be produced under certain chemical conditions and will immediately react on contact with $Fe^{2+}$ entering the containment vessel (i.e., carrying on a contact oxidation). Ferrous iron ($Fe^{2+}$) is thus oxidized to ferric iron ($Fe^{3+}$) and removed from the water. The rate of oxidation using this regenerative membrane is about 50 to 70 times that of spontaneous oxidation (i.e., using a large oxidation pond). Therefore, time for iron removal is greatly shortened and the process simplified. The reaction sequence used in producing the regenerative membrane and for regenerating the membrane are shown below:

$$4\ Fe^{2+} + O_2 + 6\ H_2O = 4\ FeO(OH) + 8\ H^+ \quad (1)$$

FeOOH is russous membrane attaching to the surface of the filter matrix particles. This material has various crystalline forms, and is known to have strong iron removal ability on contact oxidation.

Upon formation of the regenerative membrane of FeOOH, if the pH in iron containing raw water is generally held at a value over the isoelectric point of FeO(OH) (about 6.0), the membrane exhibits cation exchange adsorption characteristics. Ionic exchange absorption of $Fe^{2+}$ in water occurs first, followed by equimolar transfer of $H^+$ into the water. The reaction is as follows:

$$Fe^{2+} + FeO(OH) = FeO(OFe)^+ + H^+ \quad (2)$$

Thus, it may be seen that the oxidation of $Fe^{2+}$ to $Fe^{3+}$ is an autocatalytic reaction, which ensures new contact oxidation iron removal and prevents the membrane from aging. The final reaction in the sequence is as follows:

$$FeO(OFe)^+ + \tfrac{1}{2} O_2 + 3/2\ H_2O = 2\ FeO(OH) + H^+ \quad (3)$$

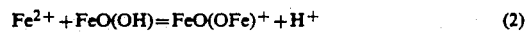

Formation of FeOOH membrane on the surface of the particles contained in the matrix may be controlled by controlling the concentration of $Fe^{3+}$ and pH in raw water entering the containment vessels 10 and 12, even though other chemical characteristics, such as silica, sulphate ion, alkalinity, carbonate and other chemical constituent concentration are changing as well as water temperature, kinds of filter media, and filtration rate.

It has been discovered that the following functional relations govern the production and regeneration of the filter membrane:

$$\Sigma[\zeta]^p \times K = [\phi] \quad (4)$$

$$[Fe^{2+}]_0/[Fe^{2+}] \times [pH] \times K = [\phi] \quad (5)$$

$$\Sigma[\zeta]p = [Fe^{2+}]_0/[Fe^{2+} \times [pH] \times K \quad (6)$$

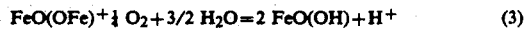

Where:
[ζ]$^p$ represents various chemical factors;
[φ] represents effect of various chemical factors on equations (2) and (3);
[$Fe^{2+}$] = raw water ferrous iron conc.;
[$Fe^{2+}$]$_0$ = water entering containment vessel ferrous iron conc. (after air added); and
K = constant; and
p = index number.

Referring again to FIG. 1 there is shown a schematic diagram of the method of treating ground water to remove iron and manganese using the above chemical reactions. Raw water is aerated with oxygen containing gas (typically air), with this mixture having a controlled [$Fe^{2+}$]$_0$/[$Fe^{2+}$] ratio and pH, as explained further herein below, being fed to one or more vessels containing the filter matrix particles (anthracite, quartz sand, nonpoisonous plastic granules, etc.). The FeO(OH) membrane attaches to the top surface of the bed of particles. Equations (4), (5), and (6) demonstrate that the best process [φ]$_C$ can be obtained simply by control of [$Fe^{2+}$]$_0$/[$Fe^{2+}$] and pH, although the other factors are also affecting reactions (2) and (3). Stated differently, the concentration of $Fe^{3+}$ controlled to within the range of about 1 mg per liter to about 5 mg per liter in the water entering the containment vessels, plus control of pH, allows adequate control of iron removal, although alkalinity, sulphate ion concentration, carbonate ion concentration, soluble silica concentration, water temperature, etc. are changing in the raw water.

The water flow rate, oxygen (air) addition rate, water inlet temperature and pressure, and degree of agitation or mixing at which reactions (1), (2), and (3) typically occur may be any value which do not result in uncontrollable pressure or temperature rise within the vessel(s), iron breakthrough to the effluent, or clogging of the vessels, and yet permit the reactions to proceed within reasonable and commercially useful periods of time.

The temperature within the vessels may range from about 0° C. to about 90° C. for the three reactions. Lower temperatures may produce freezing and clogging of the vessels, while higher temperatures may cause vaporization of the water, both unwanted for efficient operation. Preferred are temperatures ranging from about 0° C. to about 30° C.

The vessel operating pressure may vary and is somewhat dependent upon the raw water source pressure, although it can be also affected by water pumping pressure and air addition. Pressures ranging from about 2 to about 5 kg/cm$^2$ are preferred. Higher pressures, while not preferred, will not significantly affect performance of the system using the reactions above. Lower operating pressures require lower capital outlay for equipment since piping and vessels need not be as thick walled, but water may not be pumped over distances and heights required when using lower pressures.

As explained somewhat above, pH is normally kept above about 6.0 since this the approximate isoelectric point of the FeOOH membrane. Above this pH, the FeO(OH) membrane acts as a cationic exchanger in which $Fe^{2+}$ is absorbed in exchange for $H^+$. Below this pH, this reaction does not occur to any substantial degree.

The ratio [$Fe^{2+}$]$_0$/[$Fe^{2+}$] is measured indirectly by monitoring the $Fe^{3+}$ concentration with instrumentation well known in the art. The $Fe^{3+}$ concentration entering the reaction vessel ranges from about 1 mg/L to about 5 mg/L. Higher concentrations indicate not enough oxygen is entering the vessels or inadequate mixing of the air and water.

The chief advantage of this regenerative membrane is that the process of forming it and regenerating it is simple, easy to master, and practical for production use, since no attention should be paid to other chemical factors and their correlations, except for controlling pH and $Fe^{3+}$ concentration entering the filter. The cost for forming the membrane is low, and furthermore the membrane is age resistant. The membrane attaching to the plurality of particles in the matrix will not fall off or be washed away ever during backwashing. Therefore, iron removal will not be affected by backwashing. The specifications of the filtering apparatus may be chosen according to the desired treatment capacity of domestic water.

The following example, in conjunction with FIGS. 6a-h, show the effects of various parameters on the filtration apparatus including the regenerative membrane formed therein.

EXAMPLE

Using the apparatus and methods described, the results of various parametric changes on the operation of the filtration system are shown in FIGS. 6(a-h). FIG. 6a shows residual iron (mg/L) plotted against water pH, curve "a" representing 8 hours of operation, curve "b" representing 8 days of operation. The residual iron concentration passed through a minimum of about pH=6 for both curves.

Figure 6H:
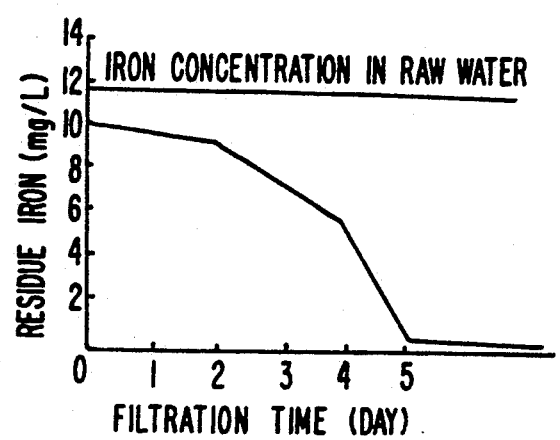
FIGS. 6(a-h) show results of adjustment of various parameters and their effect on the filtration characteristics of a water filter in accordance with the present invention.
Figure 6A:
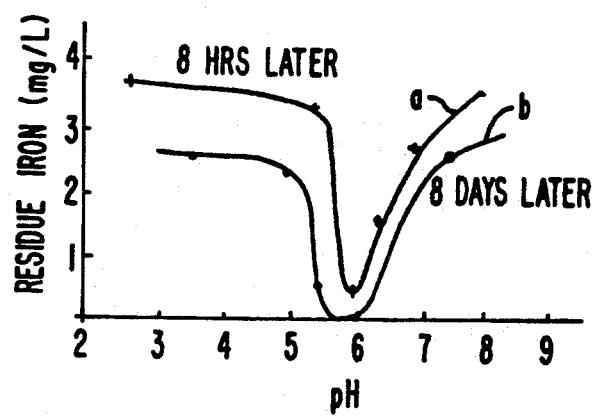
Figure 6B:
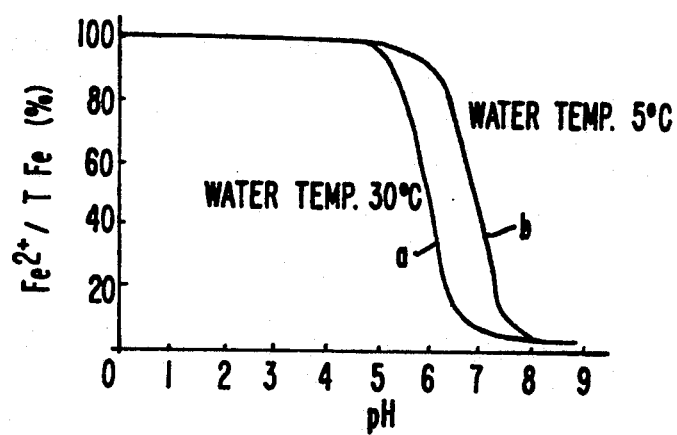

FIG. 6b shows a plot of the ratio $Fe^{2+}$/total Fe (%) versus water pH at system temperatures of 30° C. (curve "a") and 5° C. (curve "b"). It can be seen that higher temperatures gave higher $Fe^{2+}$ removal for the system.

Figure 6C:
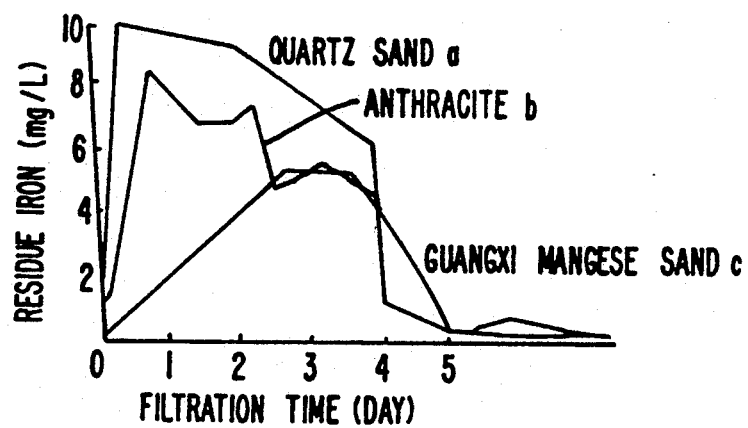
Figure 6D:
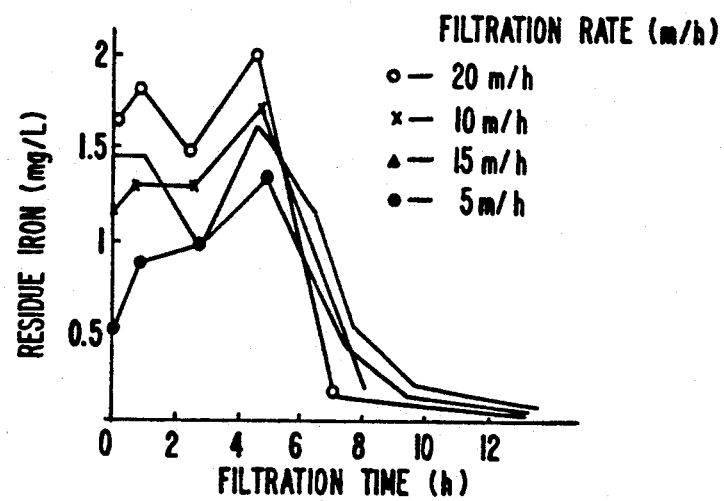

FIGS. 6c and 6d show residual iron concentration (mg/L) plotted against filtration time using various matrix materials (FIG. 6c) and filtration rates (FIG. 6d). Three matrix materials were compared in FIG. 6c: quartz sand, anthracite, and Guangxi mangese sand. Four filtration rates were compared in FIG. 6d: 20, 15, 10, and 5 m$^3$/hr. It can be seen that at higher filtration rates less iron was removed per liter of raw water, but the difference in iron removal efficiency is less drastic as time of filtration increases. (This is shown perhaps more clearly with reference to FIG. 6g, described below).

Figure 6E:
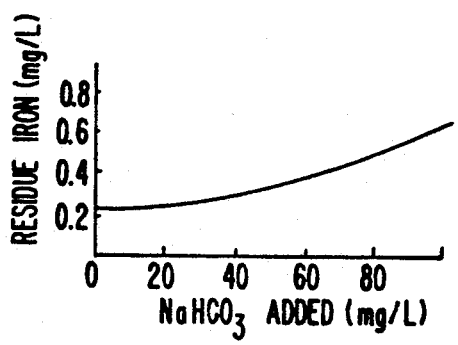
Figure 6F:
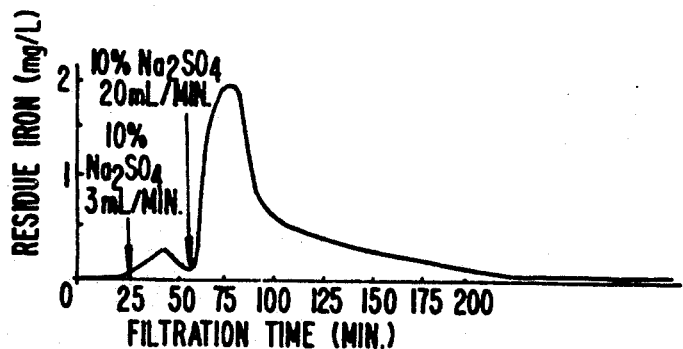

FIGS. 6e and 6f show residual iron concentration plotted versus NaHCO$_3$ added to the influent raw water (FIG. 6e) and the response of the system to Na$_2$SO$_4$ addition (FIG. 6f). An increase in NaHCO$_3$ addition from 20 mg/L to 80 mg/L did not show a linear increase in residual iron, as might be expected. The membrane thus appeared to be very resilient to changes of this impurity. The addition of Na$_2$SO$_4$ (FIG. 6f) affected the residual iron contact of the effluent significantly. However, the membrane showed good recovery to its normal operation shortly thereafter.

Figure 6G:
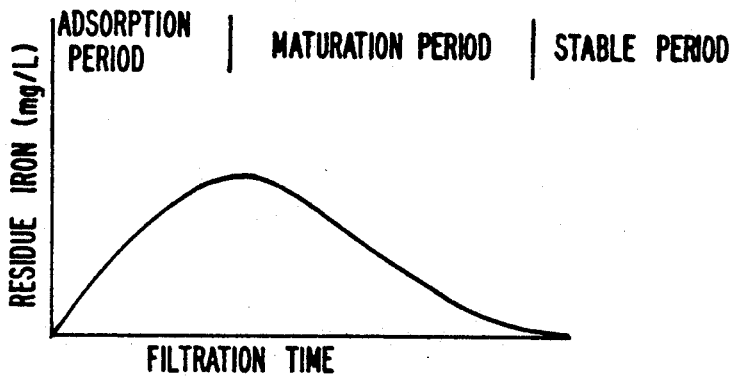

FIG. 6g shows a summary of results of various experiments at different filtration rates and matrix media. In all cases it was noted that, for the same raw water, the matrix and membrane proceeded through three stages: adsorption of $Fe^{2+}$; maturation; stable operation. This is in great contrast with prior art filtration systems employing FeO(OH), which showed decreasing iron removal efficiency with time (aging). FIG. 6g shows that with proper control of $Fe^{3+}$ entering the filtration system and control of pH, the FeOOH membrane actually stabilizes, so that it does not have to be replaced. This is due to its regenerative characteristics. Table 4 shows how differing the thickness of filter layers $L_i$ increases iron removal rate.

The foregoing description is offered primarily for purposes of illustration. It will be readily apparent to those skilled in the art that further modifications, variations and the like may be introduced in the materials, configurations, and arrangement of the various elements of the structure without departing from the spirit and scope of the invention.

TABLE 4

Iron Concentration in Filtrate and the Ability for Iron Removal

| depth (cm) | $C_{oi}$ (mg/L) | $C_i$ (mg/L) | $K_i$ (27 hrs later) × 100% |
|---|---|---|---|
| 10 | 20 | 5.0 | 13.86 |
| 35 | 20 | 0.7 | 7.86 |
| 70 | 20 | 0.15 | 4.4 | where:
$C_{oi}$ = influent iron concentration
$C_i$ = effluent iron concentration
$L_i$ = thickness of the filter layers $$K_i = \frac{\ln \frac{C_{oi}}{C_i}}{L_i}$$

What is claimed is:

1. A method of removing impurities from water comprising:
   combining air with water including $Fe^{2+}$ to form an aerated water stream;
   flowing the aerated water stream into a first containment vessel, the vessel having a plurality of particles therein;
   controlling only the amount of $Fe^{3+}$ and pH of the aerated water stream entering the vessel, thereby forming a regenerative membrane on the particles; and
   removing substantially all $Fe^{2+}$ from the aerated stream by contacting the $Fe^{2+}$ with the membrane, thereby forming a substantially deferrized stream.

2. Method in accordance with claim 1 wherein the particles have a specific gravity ranging from about 1.4 to about 2.7.

3. Method in accordance with claim 1 wherein the particles have a nonuniformity coefficient no greater than about 2.

4. Method in accordance with claim 1 wherein the particles have an average particle diameter ranging from about 1.0 mm to about 1.6 mm.

5. Method in accordance with claim 1 wherein the controlling comprises adjusting the amount of air combined with the water stream.

6. Method in accordance with claim 1 wherein the membrane is formed by reaction of oxygen and $Fe^{2+}$ to form iron oxyhydroxide.

7. Method in accordance with claim 6 wherein the removing of $Fe^{2+}$ is achieved by controlling the pH above the isoelectric point of the iron oxyhydroxide, thereby allowing cation exchange adsorption of $Fe^{2+}$ and desorption of hydrogen ion from the iron oxyhydroxide.

8. Method in accordance with claim 7 wherein the amount of air combined is sufficient to provide enough oxygen to continuously regenerate the iron oxyhydroxide.

9. Method in accordance with claim 1 which further includes flowing the substantially deferrized stream through a plurality of containment vessels substantially like the first containment vessel, thereby substantially removing the balance of $Fe^{2+}$ and manganese from the deferrized stream.

10. Method in accordance with claim 1 which further includes backwashing the first containment vessel, the backwashing continued for a time sufficient to remove unwanted particulate matter from the vessel.

11. Method according to claim 1 wherein said regenerative membrane initially exhibits a decrease in iron removal efficiency with time, then exhibits a minimum iron removal efficiency, after which the membrane matures to a final higher efficiency at a later time.

* * * * *